July 12, 1960     K. H. STADLER     2,944,323
COMPOUND TOOL
Filed Dec. 6, 1955     2 Sheets-Sheet 1
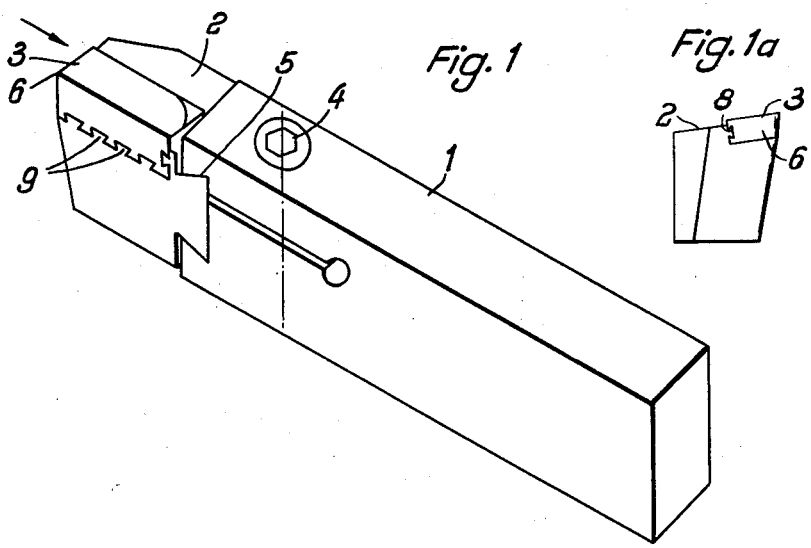
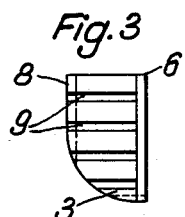
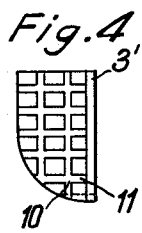
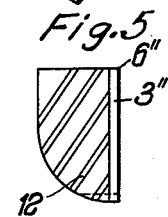
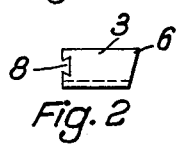
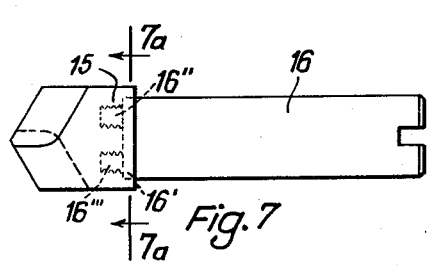
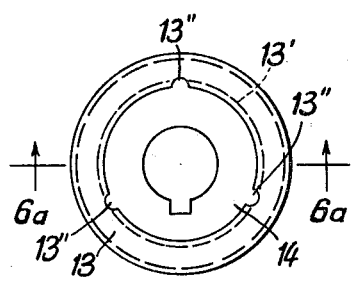
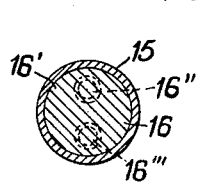
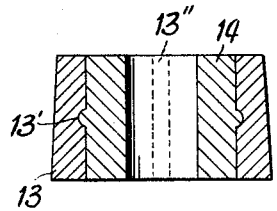
Inventor:
KARL HEINZ STADLER
By Robert H. Jacob
Agent Inventor:
KARL HEINZ STADLER United States Patent Office 2,944,323
Patented July 12, 1960

2,944,323

COMPOUND TOOL

Karl Heinz Stadler, Nurnberg, Germany, assignor to Georg Hufnagel Werkzengfabrik, Nurnberg, Germany Filed Dec. 6, 1955, Ser. No. 551,429

Claims priority, application Germany Dec. 7, 1954

2 Claims. (Cl. 29—95)

The invention relates to a tool consisting of one or more sintered, molten or cast hard metal bodies or stellites constituting cutters or the like and a setting therefor made preferably of metal. Hereinafter only the term hard metal bodies will be used for the sake of simplicity, and this is intended to include also the aforementioned stellites. The connection between the hard metal bodies on the one hand and the mounting or setting on the other was heretofore obtained by means of rivets, screws, clamps, soldering, welding or gluing. The shortcomings of these known connecting means is either that they involve a relatively large expenditure of time or work or that they do not meet the mechanical requirements. In that respect it must be considered that the loads can become very heavy because the hard metals are used for chip untying and chipless forming operations such as cutting, turning, drawing, planning, milling or hammering.

It is the object of the invention to provide a connection between a hard metal and a mounting or setting consisting of a metallic material which can be made rapidly and will be suitable for mass production while insuring faultless mechanical adhering between hard metal and mounting or setting.

It is also an object of the invention to overcome the shortcomings of the formerly widely used soldering method, such as overheating and the consequent damaging of the hard metal, as well as the development of heat tensions which can lead to rips or breaks in the hard metal.

In this connection the invention provides primarily for intimately anchoring the hard metal bodies in the embedding or setting material by die casting, press-molding, molding or casting while being simultaneously suitably formed. The forming may involve the hard metal bodies as well as also the setting. It was found, contrary to expectations, that this method provides such anchoring between hard metal bodies and embedding material as will endure without ill effects the very great mechanical loads to which tools are exposed.

Contrary to the known method the brittle and sensitive hard metal is not mechanically or thermally affected by the combining with the setting material in a manner that it can be damaged. It is essential that the heat arising during operation of such a tool is rapidly conducted away through the setting material which results in increasing the life and maintaining the sharpness of the tool. The anchoring of the hard metal bodies in the molding or setting may be further improved, depending on the circumstances, respectively the shaping, by the different coefficients of expansion which arise during the cooling. For the purpose of obtaining the best possible anchoring and to avoid thermal stresses during the production of this tool, particularly die casting or injection molding or press molding of the mounting or setting material may be advantageous. Moreover, this provides also the advantage that in this manner a complete tool consisting of a mounting or setting and hard metal or cutter can be produced in a fraction of a minute. Naturally, the production time depends on the size of the object, i.e. hard metal insert and setting. In the combining of hard metal and mounting or setting by the press molding method there results, moreover, an advantageous and still smaller heating of the hard metal than that which is obtained as a result of the other features of the invention.

As compared to the tools of the prior art, the tool in accordance with the invention can be made not only in considerably less time but also at far less cost and it must also be considered that the invention concerns as a rule a distinct mass production article.

In accordance with the invention the shaping is obtained in that the hard metal body is provided with one or several recesses, projections, interruptions or cavities in the form of grooves, dove-tails, teeth, hollows or annular shapes. These can be produced in a known manner as the hard metal body or cutter is sintered. Subsequent mechanical treatment is unnecessary. Even if considerable differences in the coefficients of expansion are involved compensation for displacement between hard metal and setting is possible by relative sliding if the recesses or cavities are suitably disposed without thereby affecting the secure anchoring.

The shaping required for the anchoring can also be achieved by making the hard metal body or cutter stellite with a circular, square or other prismatic cross-section or of conical or trapezoid shape. The invention also provides for roughening the surface of the hard metal body or cutter to improve the anchoring.

The invention also contemplates the advantageous shaping of the mounting in combination with any special form of hard metal body or per se in such a manner the hard metal body or cutter is surrounded by the mounting in such a manner that the forces arising during the operation or use of the tool are opposed.

It must still be mentioned that the mounting or setting can be given the desired final shape in the first operation while size and conformation of the body are chosen as desired. The mounting or setting in turn may be secured to a support in any desired manner by screws, rivets or clamps. It has been found that such materials can be used for the mounting which possess great durability while at the same time combining with the hard metal body or bodies to provide advantageously the direct anchoring and which do not involve difficulties or special costs in the finishing operations of the tools in accordance with the invention.

In accordance with a further object of the invention the mounting can be made of brass. It has been found that the relatively great heat conductivity of brass is of special significance in the manufacture of tools. Heretofore the hard metal bodies or cutters were connected to the steel supports or carriers by copper soldering. The heat incident to the soldering was conducted away to an insufficient extent so that the cutters became excessively hot, thereby decreasing the mechanical durability or cutting qualities. On the other hand, brass possesses such a melting point and heat conductivity that at the instant of pouring or injecting or the like of the mounting or setting material, i.e. brass, into the hard metal bodies, the heat contained in the brass is immediately conducted to the mold or form. This excludes exposing the hard metal to an excessive stress or strain.

In accordance with a further object of the invention a preferred embodiment contemplates the use of high copper content brass. The copper proportion can be as high as 90%. Compared to ordinary commercial brass which has a strength of about 35 kg. per cm.$^2$ and a Brinell hardness of 100 to 120 the high copper content brass has a tensile strength of 80 to 90 kg. per cm.$^2$ and a Brinell hardness up to 180. That corresponds to the qualities of high grade steels. By minor additions of tin and/or lead, silicon, and aluminum it is possible to create a special alloy of the high copper content brass which is especially suited for the purposes in accordance with the invention. If it is desired to obtain particularly high degrees of strength and hardness the commercial high copper content brass may be given a small addition of beryllium or cobalt. This part may be up to 2%. The materials mentioned above and those described hereinafter are known per se. It has been found, however, that the use of these materials is particularly favorable for the present purpose. Especially, where hard metal inserts or cutters are concerned which in operation are subjected to considerable thermal and mechanical stresses the brass mountings mentioned which have degrees of strength such as steel provide the great advantage that as a result of this great strength they can be put to great mechanical stresses. The cutting heat developed in the cutters or hard metal is conducted away by the brass to the support or holder or the like which receives the part consisting of hard metal and mounting or setting. Thermal and mechanical stresses of such magnitude arise, for example, when the hard metal is used for the chip untying or chipless preforming operations of steel or iron parts, i.e. where a cutting insert, a planing steel, a drill steel, a borer, tools for the mining industry such as drills, chisels, scraping tools, cutter heads for milling operations, drawing and pressing tools are concerned.

In the event that the mechanical and thermal stresses, are not very great, as for example, when hard metal is used in sleeves for drills, tools of the plastic, wood and ceramic industry, as well as with special tools in mining, the mounting may, in accordance with a further object of the invention consist of a moldable but thermally and mechanically not too rigid a material, as aluminum, duraluminum or plastic. For example, stencils used in the ceramic industry, which are inlaid with hard metal may be of plastic and just as in the case of the other mountings may in accordance with the invention be securely anchored together with the hard metal body.

In accordance with a further object of the invention the mounting may be formed while being molded around the hard metal body, as a mounting as well as holder, as for example, in a drill the shaft may be in a unitary structure with the mounting. It is also possible here simultaneously to provide a mounting with the coolant or lubricant ducts into the interior of the shaft, such as suitable cavities, recesses, etc.

Furthermore, the invention contemplates improvements of the hard metal body which may comprise a diagonal recess or cavity or projections or raised portions extending at an acute angle with respect to the cutting edge. Preferably these recesses, which may have any desired cross section may be disposed transversely of the direction of the stresses occurring during cutting or similar operations. In this connection the stresses are on the one hand well intercepted and on the other hand, as already mentioned, a favorable balance of the heat stresses is possible. It is also possible to provide recesses in the hard metal which cross one another at an angle, particularly at a right angle, which permit especially intimate anchoring between the hard metal and the mounting.

For example, in connection with so-called cutting mushrooms the invention proposes an annular body of hard metal into which a circular mounting is moulded, injected or the like. Here the heating stresses are advantageously eliminated which occurred heretofore during soldering of such mushrooms.

The drawings show several embodiments in accordance with the invention which may be used, for example, as cutting steels.

Fig. 1 is a complete cutting tool;

Fig. 1a is an end view of the tool in accordance with Fig. 1 taken from the left side;

Figs. 2–5 illustrate hard metal bodies or cutters;

Figs. 6 and 7 show two further possibilities of using a hard metal body with a mounting.

Figs. 6a and 7a are cross sectional views along lines A—A of Figs. 6 and 7;

Figure 8:
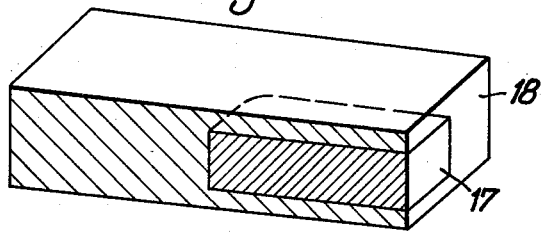
Figs. 8–13 illustrate several possibilities of the anchoring between hard metal bodies and mounting.
Figures 9A, 9B, 9C, 9D, 9E:
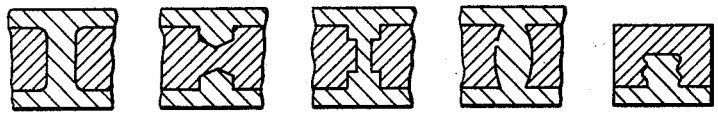

The cutting tool in accordance with Fig. 1 comprises the actual cutting steel support 1, the mounting 2 and the hard metal body, stellite or cutter 3. The mounting 2 is clamped by means of a screw connection 4 into the dovetail 5 of the support 1.

Figs. 2 and 3 show the hard metal body or cutter in greater detail. Fig. 2 shows a view in accordance with the arrow in Fig. 1. Here the cutting point is indicated at 6 and the recesses 8 constitute a longitudinal dovetail connection. Fig. 3 shows a bottom view of the hard metal body 3 having recesses 9 of dovetail shape extending transversely. In accordance with Fig. 4 the bottom surface of a hard metal body 3′ may also be provided with recesses 10 and 11 extending at right angles. The cross section of these recesses may be chosen as desired, as for example ribs, grooves, dovetail shapes, circular shapes or the like.

In accordance with Fig. 5 the hard metal bodies 3″ are provided with recesses 12 at the bottom extending diagonally in a direction transversely of the cutting forces which arise primarily at the edge 6″.

The recesses can be produced in a known manner during pressing, molding or pre-sintering of the hard metal body.

Fig. 6 shows annular metal body 13 which in a mounting 14 is embedded by molding, or injection or the like. This arrangement may be used as a so-called cutting mushroom or hard metal covered saw, miller or the like. The hard metal bodies 13 and 15 may be provided with the recesses described as indicated also in the cross section in accordance with Fig. 6a.

In Fig. 7 the hard metal body 15 is anchored to the mounting 16 by injection molding, casting or the like. Here the part 16 is simultaneously a molded or injected mounting and support or holder. An arrangement of this type can be used as drill, sinker, milling tool or impact tool.

The hard metal bodies 13 and 15 may be provided with the recesses already discussed but which are not shown in the drawing.

In Fig. 8 the mounting 18 is arranged around the hard metal body 18 in the described manner.

Figs. 9a to 9e show diverse embodiments of hard metal bodies having annular cross sections which are provided with one or several projections, recesses or the like. Thus one as well as two hard metal bodies may be embedded in the mounting. Also here the mounting is designated by cross hatching.

Figure 10A:
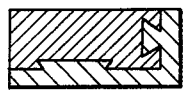
Figure 10B:
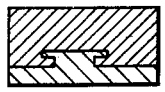
Figure 10C:
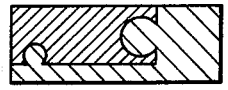
Figure 11A:
Figure 11B:
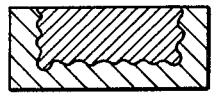
Figure 11C:
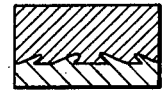

The examples in accordance with Figs. 10a, 10b, 10c, 11a, 11b, 11c and 12a, 12b and 12c show hard metal bodies of rectangular, prismatic, trapezoidal, conical or hexagonal cross sections which are provided with one or more protrusions or recesses in the form of grooves, dovetails (Figs. 10a, 11a, 12b), slots (Figs. 10b and 12b) or of circular conformation (Fig. 10c). In accordance with Fig. 11c it is also possible to use serrated or grooved profiles while Fig. 13 shows the hard metal body with a coarsely roughened surface.

Figure 12A:
Figure 12B:
Figure 12C:
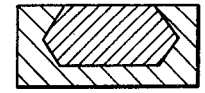
Figure 13:
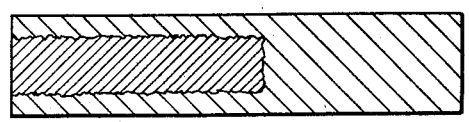

Figs. 12a and 12c show in particular the manner in which the mounting material may surround the hard metal body so that it opposes the forces arising in operation.

The invention has been described with reference to a plurality of illustrative embodiments but it is not limited thereto, and what I desire to protect by Letters Patent of the United States is set forth in the appended claims.

I claim:
1. A cutting tool for a lathe comprising a pre-formed and sintered cutting body of a hard metal alloy such as stellite having a cutting edge and at least one elongated side having projections and recesses of a conformation presenting interengaging elongated surfaces, said recesses increasing in width toward the core of said body, and a mounting member of die cast brass alloy having a high copper content, great strength and relatively high heat conductivity press molded onto and interlocked with said body along adjacent sides and partly encompassing said body, said mounting presenting projections and recesses defining interengaging elongated surfaces intimately engaging the interengaging elongated surfaces presented by said recesses of said body of hard metal alloy and completely filling said recesses.

2. A cutting tool for a lathe comprising a pre-formed and sintered cutting body of a hard metal alloy such as stellite having a cutting edge and at least one elongated side having projections and recesses of a conformation presenting interengaging elongated surfaces, said recesses increasing in width toward the core of said body, and a mounting member of die cast brass alloy having a high copper content, great strength and relatively high heat conductivity press molded onto and interlocked with said body along adjacent sides and partly encompassing said body, said mounting presenting projections and recesses defining interengaging elongated surfaces intimately engaging the interengaging elongated surfaces presented by said recesses of said body of hard metal alloy and completely filling said recesses and said projections and recesses extending obliquely to the cutting edge of the cutter in a manner permitting displacement of said cutting body relative to said member resulting from different coefficients of expansion.

References Cited in the file of this patent

UNITED STATES PATENTS

| | | |
|---|---|---|
| 1,267,782 | McKerahan | May 28, 1918 |
| 1,273,248 | Lurker | July 23, 1918 |
| 1,547,839 | Steenstrup | July 28, 1925 |
| 1,719,337 | Miller | July 2, 1929 |
| 1,733,657 | Ericson | Oct. 29, 1929 |
| 1,908,208 | Yassenoff | May 9, 1933 |
| 1,939,768 | De Bats | Dec. 19, 1933 |
| 1,950,354 | De Bats | Mar. 6, 1934 |
| 1,950,355 | De Bats | Mar. 6, 1934 |
| 1,951,174 | Simons | Mar. 13, 1934 |
| 2,036,656 | Stowell | Apr. 7, 1936 |
| 2,044,853 | Laise | June 23, 1936 |
| 2,070,156 | De Bats | Feb. 9, 1937 |
| 2,135,380 | Benge | Nov. 1, 1938 |
| 2,141,202 | Wallace | Dec. 27, 1938 |
| 2,275,420 | Clark | Mar. 10, 1942 |
| 2,357,088 | Curtis | Aug. 29, 1944 |
| 2,413,989 | Molner | Jan. 7, 1947 |
| 2,607,108 | See | Aug. 19, 1952 |

FOREIGN PATENTS

| | | |
|---|---|---|
| 505,480 | France | May 7, 1920 |
| 347,173 | Great Britain | Apr. 20, 1921 |
| 312,320 | Great Britain | Apr. 10, 1930 |